US012405995B2

(12) United States Patent
Chaudhary et al.

(10) Patent No.: US 12,405,995 B2
(45) Date of Patent: Sep. 2, 2025

(54) USING LARGE GENERATIVE MODELS WITH IMPROVED GROUNDING TO IMPROVE IMAGE CONTEXT QUERIES

(71) Applicant: Microsoft Technology Licensing, LLC, Redmond, WA (US)

(72) Inventors: Vishrav Chaudhary, Covington, WA (US); Bradley Moore Abrams, Palo Alto, CA (US); Kamal Ginotra, Kirkland, WA (US); Owais Khan Mohammed, Bellevue, WA (US); Barun Patra, Vancouver (CA); Michael Lawrence Valenzuela, Yelm, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/527,923

(22) Filed: Dec. 4, 2023

(65) Prior Publication Data
US 2025/0181631 A1  Jun. 5, 2025

(51) Int. Cl.
*G06F 16/532* (2019.01)
*G06F 16/242* (2019.01)

(52) U.S. Cl.
CPC .......... *G06F 16/532* (2019.01); *G06F 16/243* (2019.01)

(58) Field of Classification Search
CPC .............................. G06F 16/532; G06F 16/243
See application file for complete search history.

(56) References Cited

U.S. PATENT DOCUMENTS

| 2021/0357779 | A1* | 11/2021 | Kabra | G06N 5/04 |
| 2023/0016082 | A1* | 1/2023 | Kabra | G06N 5/04 |
| 2024/0127085 | A1* | 4/2024 | Kabra | G06N 20/00 |

* cited by examiner

Primary Examiner — Baoquoc N To
(74) Attorney, Agent, or Firm — Ray Quinney & Nebeker P.C.; Christopher K. Hallstrom

(57) ABSTRACT

The disclosure describes utilizing an image query system to improve response accuracy and reduce computational steps resources in responding to natural language queries of input images. In various implementations, the image query system utilizes grounding information from one or more sources to determine accurate information for an input image. For example, the image query system uses a single comprehensive image prompt to obtain extensive visual image grounding information for the input image from a visual-based large generative model. Additionally, or in alternative implementations, the image query system obtains reverse image search grounding information for the input image. The image query system then cleverly utilizes the grounding information with a large generative language model to generate text query responses to image-based queries of the input image more accurately and efficiently.

20 Claims, 12 Drawing Sheets

USING LARGE GENERATIVE MODELS WITH IMPROVED GROUNDING TO IMPROVE IMAGE CONTEXT QUERIES

BACKGROUND

Search engine services have significantly enhanced the ability to explore websites across the vast expanse of the Internet. More recently, advanced chat services utilizing artificial intelligence (AI), known as large generative models (LGMs), including large language models (LLMs), have emerged. In some cases, LGMs use machine-learning models to provide information about user-submitted images. Despite these and other recent advancements, LGMs still suffer from various shortcomings.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
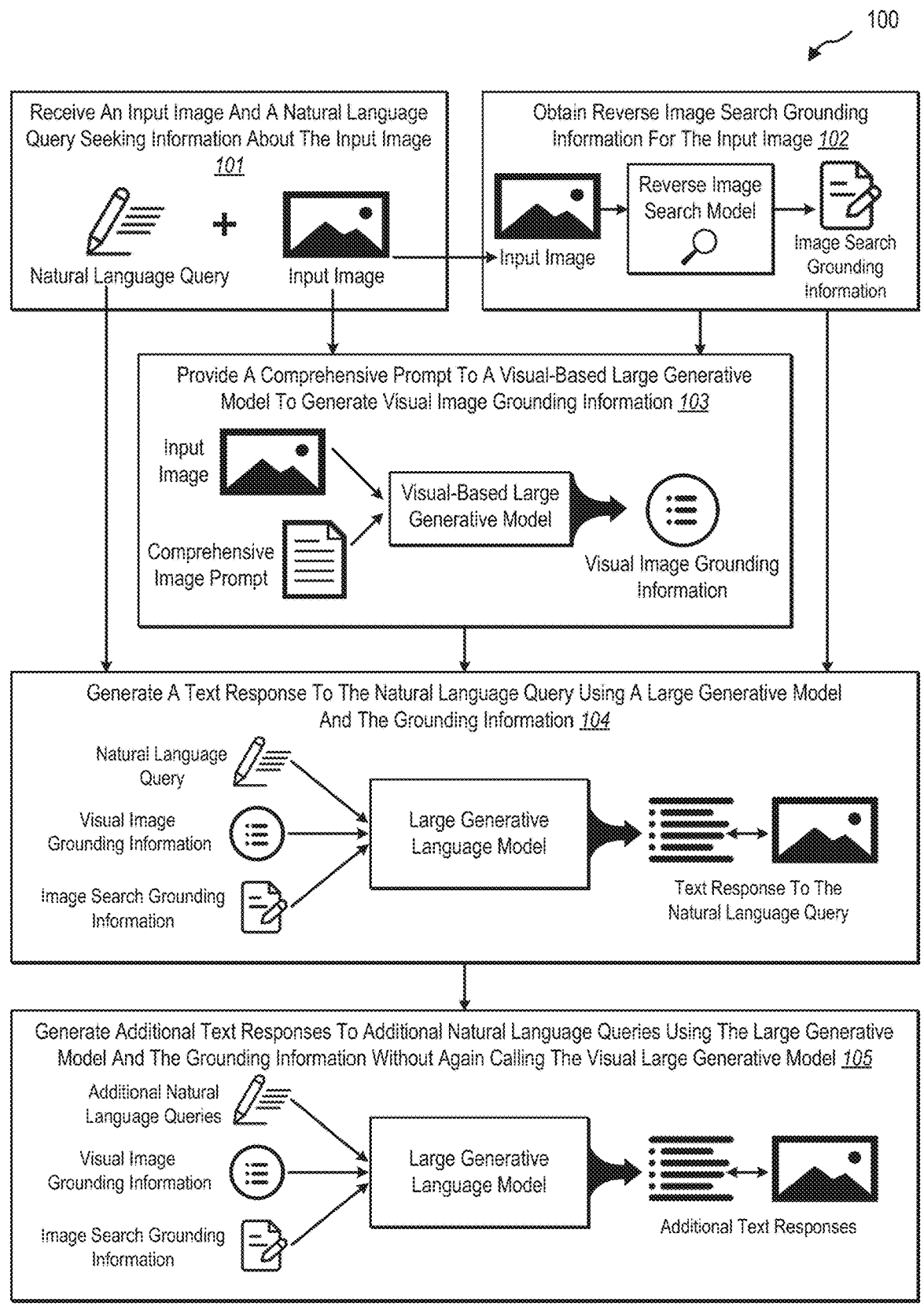
FIG. 1 illustrates an example overview of implementing the image query system that uses one or more large generative models to accurately and efficiently generate one or more text query responses to image-based queries for an input image.

This disclosure describes utilizing an image query system to generate responses to natural language queries regarding input images in a way that improves response accuracy and reduces computational resources. In various implementations, the image query system utilizes grounding information from one or more sources to determine accurate information for an input image. For example, the image query system uses a single comprehensive image prompt to obtain extensive visual image grounding information for the input image from a visual-based large generative model. Additionally, or in alternative implementations, the image query system obtains reverse image search grounding information for the input image. The image query system then utilizes the grounding information with a large generative language model to more accurately and efficiently generate text query responses to image-based queries of the input image.

In particular, implementations of the present disclosure provide benefits and solve problems in the art with systems, computer-readable media, and computer-implemented methods using an image query system that improves accuracy and reduces computing operations using a combination of large generative models and dynamic grounding information. Indeed, as further explained below, the image query system provides improved accuracy and efficiency compared to existing systems.

As mentioned above, LGMs still suffer from various shortcomings. For instance, some existing computer systems that use LGMs to provide image-based information suffer from several inaccuracies and inefficiencies. For example, LGMs often provide unsatisfactory results when describing images, especially newer images for which the LGM was not trained. Furthermore, these existing computer systems perform many expensive and unnecessary computer operations.

In contrast to existing systems, the image query system provides several technical benefits. To illustrate, in one or more implementations, based on receiving an input image and a corresponding natural language query, the image query system obtains reverse image search grounding information for the input image. In some implementations, the image query system provides a comprehensive image prompt and the input image to a visual-based large generative model to generate visual image grounding information. Using the grounding information (e.g., the visual image grounding information and/or the reverse image search grounding information), the image query system generates a text query response to the natural language query using a large generative language model. The image query system then provides the text query response to the user to answer the natural language query.

As another illustration, in some implementations, based on receiving an input image and a corresponding natural language query, the image query system obtains reverse image search grounding information for the input image and generates a text query response to the natural language query using a large generative language model based on the reverse image search grounding information. If the image query system determines that the text query response meets a threshold confidence value, the image query system provides the text query response to the user without prompting a visual-based large generative model. Otherwise, to ensure an accurate answer when the threshold confidence value is not met, the image query system may prompt the visual-based large generative model for additional image context information that may be used to answer the user query.

Regarding the shortcomings of existing systems, as mentioned above, while some existing systems provide information about user-submitted images, such as answering questions about an input image, these systems often produce incorrect and unsatisfactory text query responses. This problem worsens when the input image is unique (e.g., not frequently found online) or recently posted online. In these instances, even large generative models struggle to provide accurate answers regarding these input images. More commonly, the large generative model provides a response seeking more information from the user (e.g., asking the user to answer their own question) or indicating that an accurate response is unavailable.

In contrast to existing systems, as described in this disclosure, the image query system delivers several significant technical benefits in terms of computing accuracy and efficiency. Moreover, the image query system provides several practical applications that address problems related to accurately and efficiently generating multiple text query responses using various large generative models and grounding information.

To elaborate, in some examples, the image query system improves computing efficiency by using a comprehensive image prompt. For example, by using a single comprehensive image prompt to the visual-based large generative model, which is separate from any specific natural language query, the image query system obtains extensive visual image grounding information that the large generative language model uses to answer multiple natural language queries for the input image. Indeed, because calls to the visual-based large generative model are even more computationally expensive than to inference or run the large generative language model, the image query system saves a significant amount of memory and processing resources by not calling the visual-based large generative model more than once per input image regardless of the number of corresponding natural language queries.

Additionally, by using visual image grounding information obtained from the comprehensive image prompt, the large generative language model has more context regarding the input image and generates text query responses with improved accuracy. Further, in various implementations, the image query system provides reverse image search grounding information to the visual-based large generative model, which allows the visual-based large generative model to generate even more accurate versions of the visual image grounding information. Likewise, by using the reverse image search grounding information, the large generative language model also generates more accurate text query responses. Moreover, obtaining the reverse image search grounding information is computationally inexpensive compared to executing the large generative language model and almost trivial compared to executing the visual-based large generative model.

In some implementations, the image query system further improves computing efficiency by not calling the visual-based large generative model. In these instances, the image query system uses the reverse image search grounding information in the large generative language model to generate an initial text query response. If the initial text query response is sufficiently accurate, the image query system provides it to the user. Otherwise, if the initial text query response does not meet a threshold confidence value for accuracy, the image query system calls the visual-based large generative model for visual image grounding information to generate an accurate text query response.

As a further technical benefit, the image query system flexibly operates with unique and recently published images. For example, by gathering reverse image search grounding information based on identifying identical and/or similar images to the input image, the image query system can obtain and implement the reverse image search grounding information, as provided above, to generate accurate text query responses.

As illustrated in the foregoing discussion, this disclosure utilizes a variety of example terms to describe the features and advantages of one or more implementations. For instance, this disclosure describes the image query system in the context of a cloud computing system. As an example, the term "cloud computing system" refers to a network of interconnected computing devices that provide various services and applications to computing devices (e.g., server devices and client devices) inside or outside of the cloud computing system. Additional terms are defined throughout the document in different examples and contexts.

As another example, the term "large generative model" (LGM) refers to an artificial intelligence system with billions or trillions of parameters that uses deep learning to produce coherent and contextually relevant text based on patterns learned from large amounts of training data. In various implementations, a generative learning model, such as a multi-modal generative model, refers to an advanced computational system that uses natural language processing, machine learning, and/or image processing to generate coherent and contextually relevant human-like responses.

As mentioned above, large generative models have a large number of parameters (e.g., in the billions or trillions) and are trained on a vast dataset to produce fluent, coherent, and topic-specific outputs (e.g., text and/or images). Large generative models have applications, including natural language understanding, content generation, text summarization, dialog systems, language translation, creative writing assistance, and image generation. A single large generative model performs a wide range of tasks based on different inputs, such as prompts (e.g., input instructions, rules, example inputs, example outputs, and/or tasks), data, and/or access to data. In response, the large generative model generates various output formats ranging from one-word answers to long narratives, images and videos, labeled datasets, documents, tables, and presentations.

Large generative models include large generative language models (LGLMs) (a.k.a. simply "large language models" (LLMs)), which are primarily based on transformer architectures to understand, generate, and manipulate human language. LLMs can also use a recurrent neural network (RNN) architecture, long short-term memory (LSTM) model architecture, convolutional neural network (CNN) architecture, or other architecture types. Examples of LLMs include generative pre-trained transformer (GPT) models such as GPT-3.5 and GPT-4, bidirectional encoder representations from transformers (BERT) model, text-to-text transfer transformer models such as T5, conditional transformer language (CTRL) models, and Turing-NLG. Other types of large generative models include sequence-to-sequence models (Seq2Seq), vanilla RNNs, and LSTM networks.

Large generative models include visual-based large generative models (LGM-V). Visual-based large generative models generate visual image grounding information from an input image. For instance, a visual-based large generative model uses a combination of convolutional neural networks (CNNs) and transformers to generate high-quality visual content and/or extract visual features from the input image.

As an example, the term "prompt" refers to a query or input provided to a large generative model that provides instructions, directions, guidelines, and/or parameters for generating an answer or result. A prompt may include carefully selected parameters determined based on various factors, such as available input information and desired output data format. In some implementations, a prompt includes and/or references additional information being provided to a large generative model. Additional examples of prompts, including user-generated prompts (e.g., natural language query) and system-generated prompts are provided below.

As another example, the term "grounding information" refers to a set of visual information associated with an image (e.g., an input image provided by a user). Grounding information provides context for an image based on processing and analyzing the image. In some instances, grounding information is extracted directly from an image, such as visual image grounding information. For example, grounding information includes the most relevant identified objects or regions in an image text, image metadata, and/or other image information. In some implementations, grounding information is indirectly obtained for the image by using external content associated with identical or similar instances of an input image (e.g., reverse image search grounding information). For instance, reverse image search grounding information includes text from a website that includes an image similar or identical to the input image.

Additionally, as an example, a "network" refers to one or more data links that enable electronic data transport between computer systems and/or modules and/or other electronic devices. A network may include public networks such as the Internet as well as private networks. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above are also included within the scope of computer-readable media.

Additional example implementations and details of the image query system are discussed in connection with the accompanying figures, which are described next. For example, FIG. 1 illustrates an example overview of implementing the image query system using large generative models to accurately and efficiently generate one or more text query responses to image-based queries for an input image according to some implementations. As shown, FIG. 1 illustrates a series of acts 100 performed by the image query system within a cloud computing system.

As shown, the series of acts 100 includes act 101 of receiving an input image and a natural language query seeking information about the input image. For instance, the image query system receives a request that includes the input image and a corresponding natural language query requesting information about the input image. In some instances, the request is provided as part of a search or chat service that answers queries and requests from users.

In one or more implementations, the image query system obtains reverse image search grounding information for the input image, as shown in act 102. For instance, in various implementations, the image query system provides the input image to a reverse image search model to generate image search grounding information. Additional details about reverse image search grounding information are provided below in connection with FIG. 4A. In some instances, the image query system skips act 102 and does not obtain reverse image search grounding information.

As shown, the series of acts 100 includes act 103 of providing a comprehensive image prompt to a visual-based large generative model to generate visual image grounding information. In many instances, the image query system provides the input image to a visual-based large generative model along with a comprehensive image prompt with directions to generate visual image grounding information for the input image. The comprehensive image prompt is independent of the natural language query and is designed to cover a wide range of potential natural language queries. In some instances, the image query system may provide the image search grounding information to the visual-based large generative model.

The image query system uses the comprehensive image prompt to task the visual-based large generative model to provide as much grounding information as possible about the input image. Additional details about generating visual image grounding information are provided below in connection with FIG. 3A. In a few implementations, the image query system bypasses act 103 of using the visual-based large generative model, as described below in connection with FIG. 5A.

As shown, the series of acts 100 includes act 104 of generating a text query response to the natural language query using a large generative model and the grounding information. For instance, the image query system provides the natural language query along with one or more pieces of grounding information to a large generative model, such as a large language model, to generate a text query response to the natural language query. Depending on the grounding information obtained, the image query system provides the visual image grounding information and/or the image search grounding information to the large generative model to assist it in generating an accurate text query response. Additional details about generating text query responses using a large generative model are provided below in connection with FIG. 3A, FIG. 4A, and FIG. 5A.

In addition, as shown, the series of acts 100 includes act 105 of generating additional text query responses to additional natural language queries using the large generative model and the grounding information without again calling the visual-based large generative model. For instance, upon providing the first text query response to a user, the image query system may receive additional natural language queries. For each query, the image query system utilizes the previously received grounding information and the large generative model to answer the additional queries. This way, the image query system significantly saves computer resources by not calling the visual-based large generative model, which is much more computationally expensive than calling the large generative model. Furthermore, by using the comprehensive grounding information previously received, the image query provides highly accurate text query responses to the additional queries. Additional details about generating additional text query responses without making additional calls to the visual-based large generative model are provided below in connection with FIG. 3B, FIG. 4B, and FIG. 5B.

Figure 2:
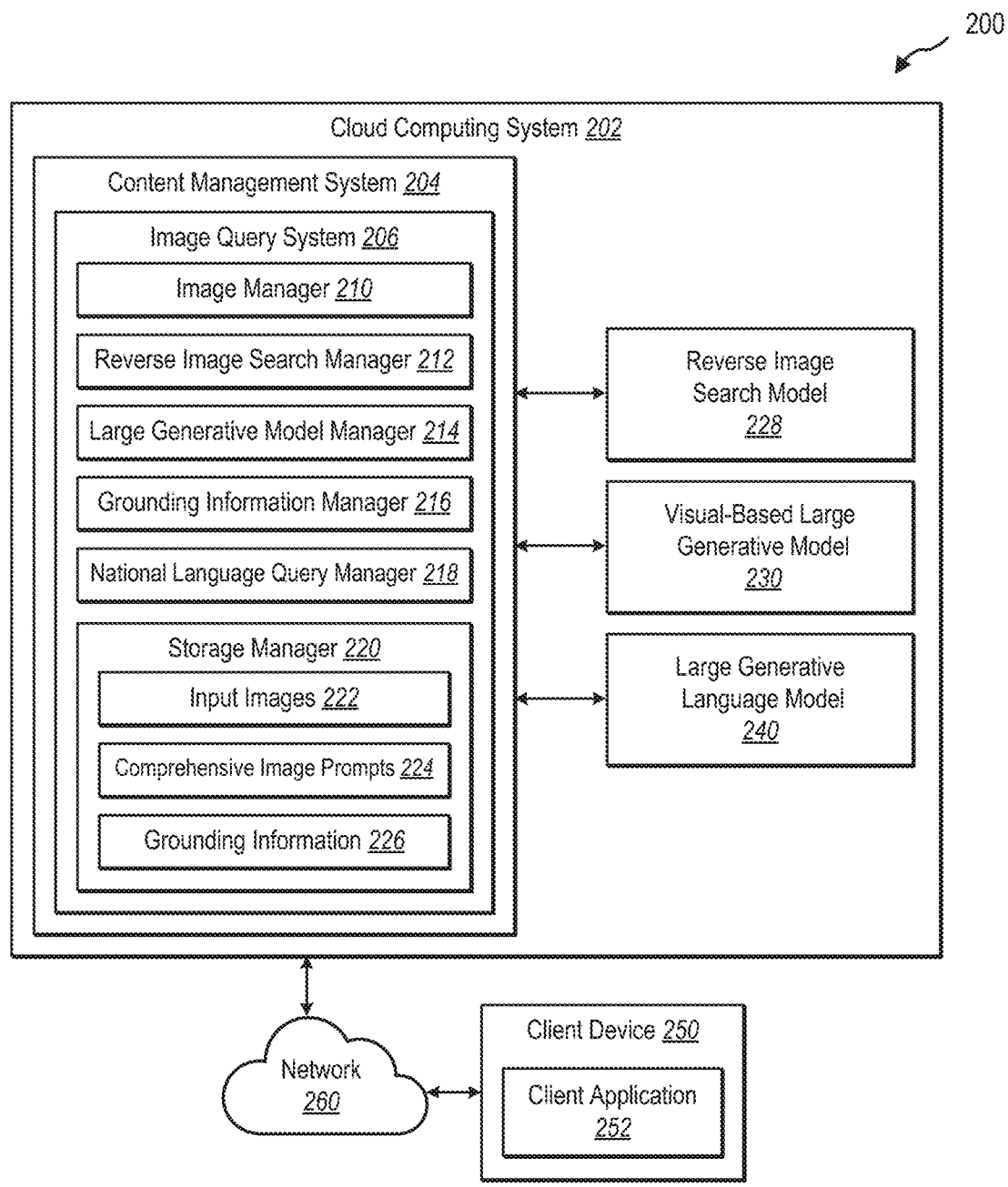
FIG. 2 illustrates an example computing environment in which the image query system is implemented in a cloud computing system.

With a general overview in place, the next figure provides a general overview of the components, features, and elements of the image query system. To illustrate, FIG. 2 shows an example computing environment where the image query system is implemented in a cloud computing system according to some implementations. In particular, FIG. 2 shows an example of a computing environment 200 of various computing devices within a cloud computing system 202 associated with an image query system 206. While FIG. 2 shows example arrangements and configurations of the computing environment 200, the cloud computing system 202, the image query system 206, and associated components, other arrangements and configurations are possible.

As shown, the computing environment 200 includes a cloud computing system 202 and a client device 250 connected via a network 260. The cloud computing system 202 includes a content management system 204, a reverse image search model 228, a visual-based large generative model 230, and a large generative language model 240. Each of these components may be implemented on one or more computing devices, such as on a set of one or more server devices. Further details regarding computing devices are provided below in connection with FIGS. 7A-7B along with Additional details about networks, such as the network 260 shown.

The content management system 204 performs a variety of functions. For example, in one or more implementations, the content management system 204 facilitates user interactions with various machine-learning models including the large generative language model 240. For example, the content management system 204 provides text query responses within a search service to natural language queries that do not include input images.

As shown, the content management system 204 includes the image query system 206. In some implementations, the content management system 204 is located on a separate computing device from the content management system 204 within the cloud computing system 202. For example, the image query system 206 is on another server device, or the image query system 206 is located wholly or in part on the client device 250.

As mentioned earlier, the image query system 206 generates text query responses to natural language queries about input images. As shown, the image query system 206 includes various components and elements, which are implemented in hardware and/or software. For example, the image query system 206 includes an image manager 210, a reverse image search manager 212, a large generative model manager 214, a grounding information manager 216, a natural language query manager 218, and a storage manager 220 having input images 222, a comprehensive image prompt 224, and grounding information 226.

As mentioned above, the image query system 206 includes the image manager 210, which manages receiving, accessing, and handling input images 222. The image manager 210 directly or indirectly obtains input images 222 corresponding to a natural language query. For example, a user may directly provide an input image or may provide access (e.g., a link) to an input image.

The image query system 206 also includes the reverse image search manager 212, which generates image search grounding information by providing input images 222 to the reverse image search model 228, which generates and returns the image search grounding information. The reverse image search manager 212 may provide the image search grounding information to the storage manager 220 to store it as grounding information 226.

As shown, the image query system 206 includes the large generative model manager 214, which provides prompts to large generative models. For example, the large generative model manager 214 provides a comprehensive image prompt 224 to the visual-based large generative model 230. In some instances, the large generative model manager 214 generates other prompts (e.g., large generative model-based prompts) to provide to the large generative language model 240 to generate text query responses, as further described below.

The image query system 206 also includes the grounding information manager 216, which communicates with the visual-based large generative model 230 to generate visual image grounding information. In some instances, the grounding information manager 216 works with the reverse image search manager 212 to obtain the image search grounding information. When grounding information is received, the grounding information manager 216 may provide it to the storage manager 220 to be stored as the grounding information 226. The grounding information manager 216 can also access stored grounding information when it is needed by components of the image query system 206.

As shown, the image query system 206 includes the natural language query manager 218, which receives, stores, provides, and manages natural language queries received from users. In some instances, the natural language query manager 218 provides generated text query responses back to users in response to a natural language query.

As shown, the cloud computing system 202 includes the client device 250. In various implementations, the client device 250 is associated with a user (e.g., a user client device), such as a user who interacts with the image query system 206 to request and receive text query responses to natural language queries. For example, the client device 250 includes a client application 252, such as a web browser or another form of computer application for accessing and/or interacting with the image query system 206 via the network 260.

Figure 3A:
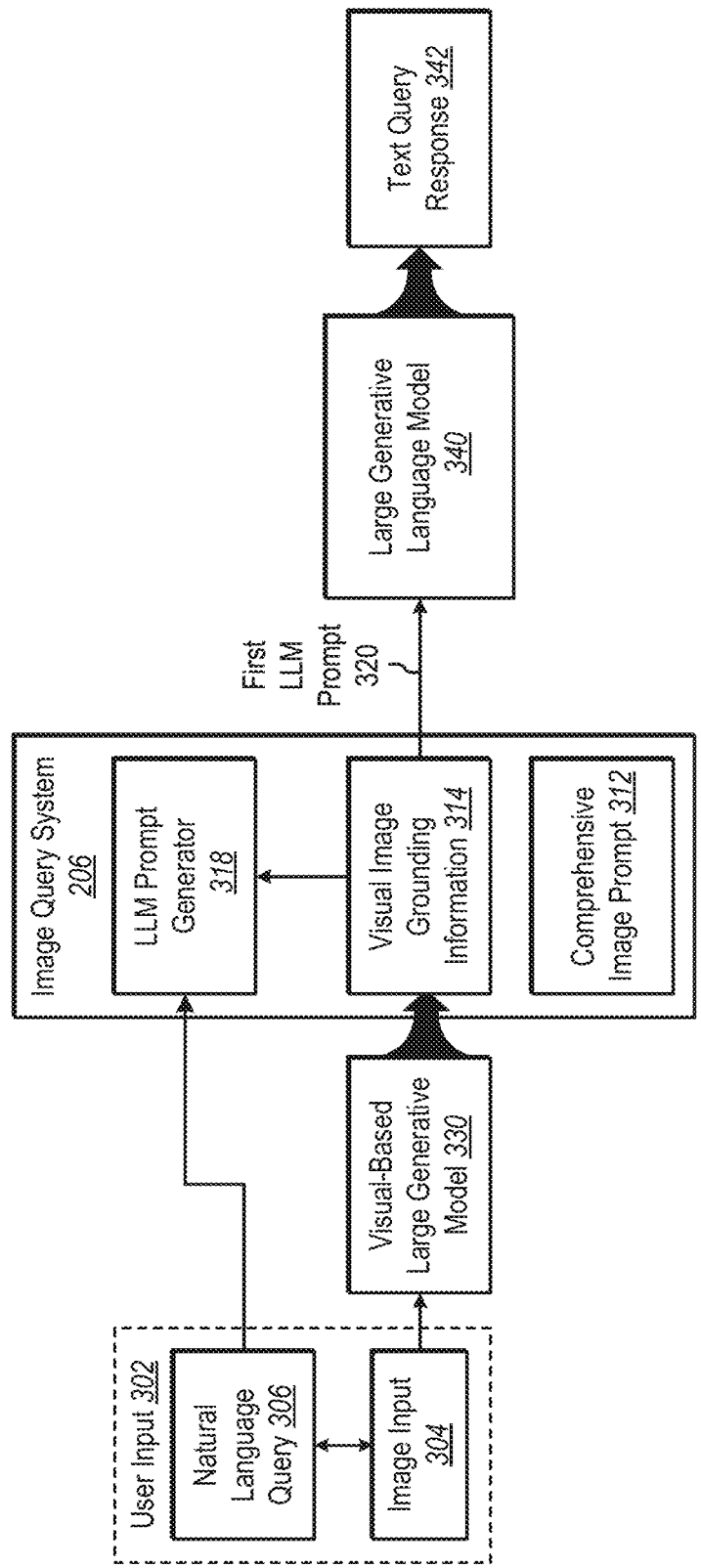
FIGS. 3A-3B illustrate example workflow diagrams for efficiently generating multiple text query responses using a large generative language model and a visual-based large generative model.
Figure 3B:
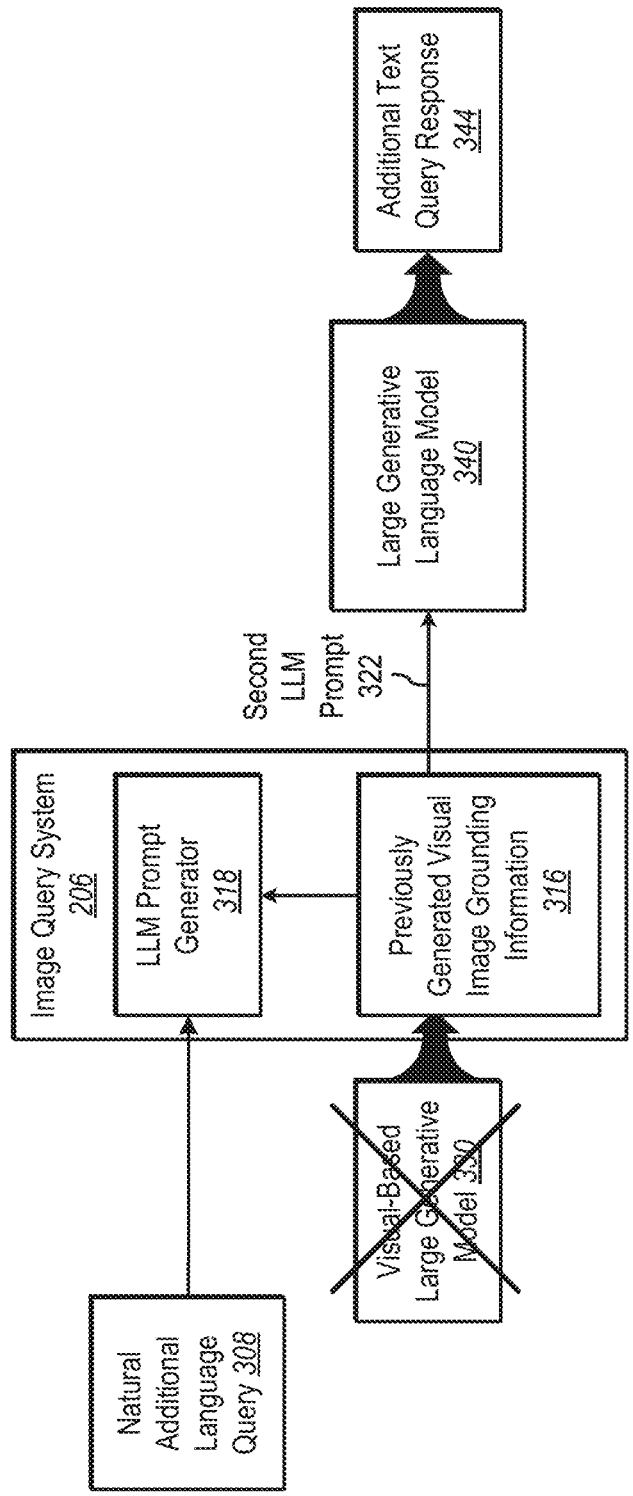
Figure 4A:
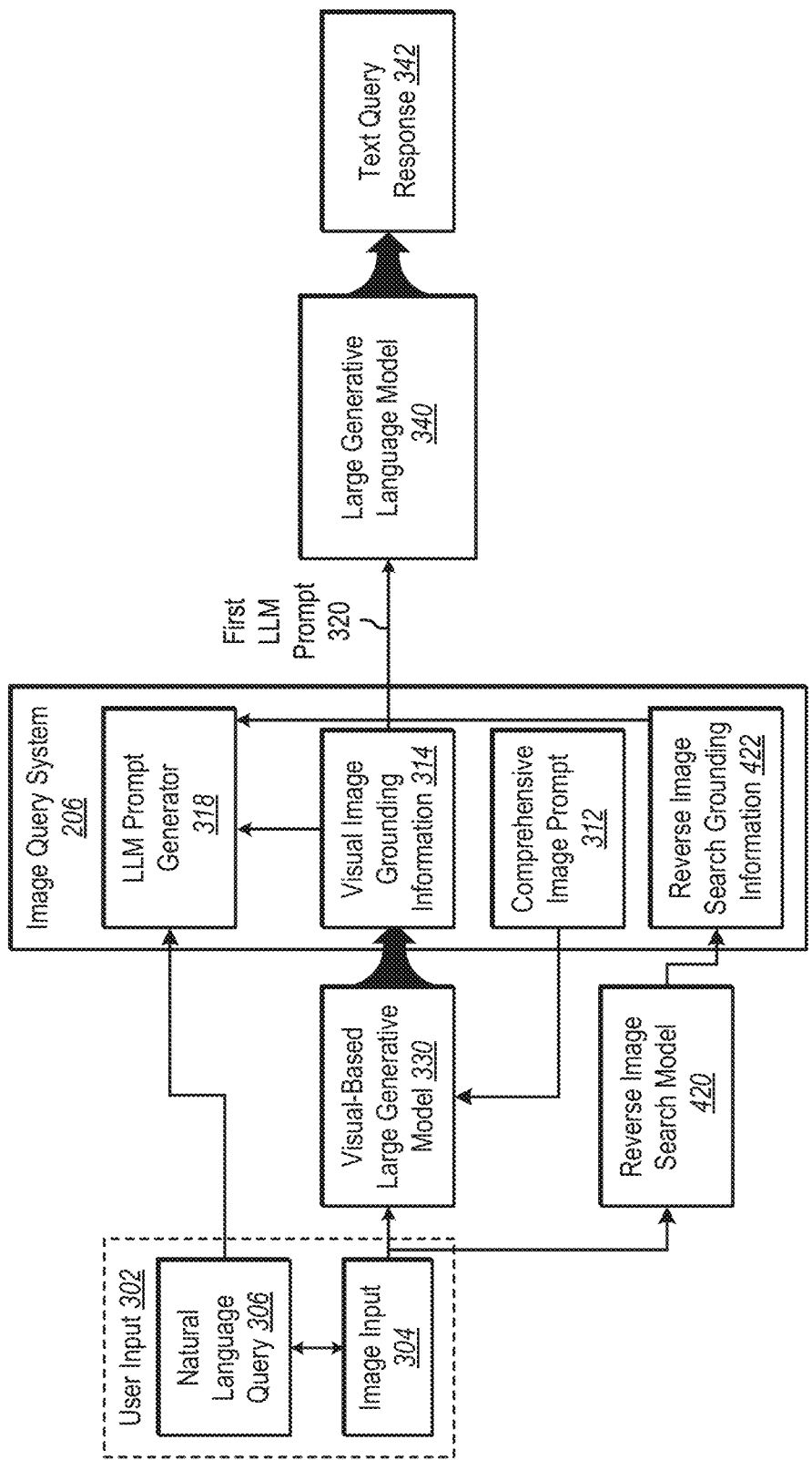
FIGS. 4A-4B illustrate example workflow diagrams for efficiently generating multiple text query responses using a large generative language model, a visual-based large generative model, and reverse image search grounding information.
Figure 4B:
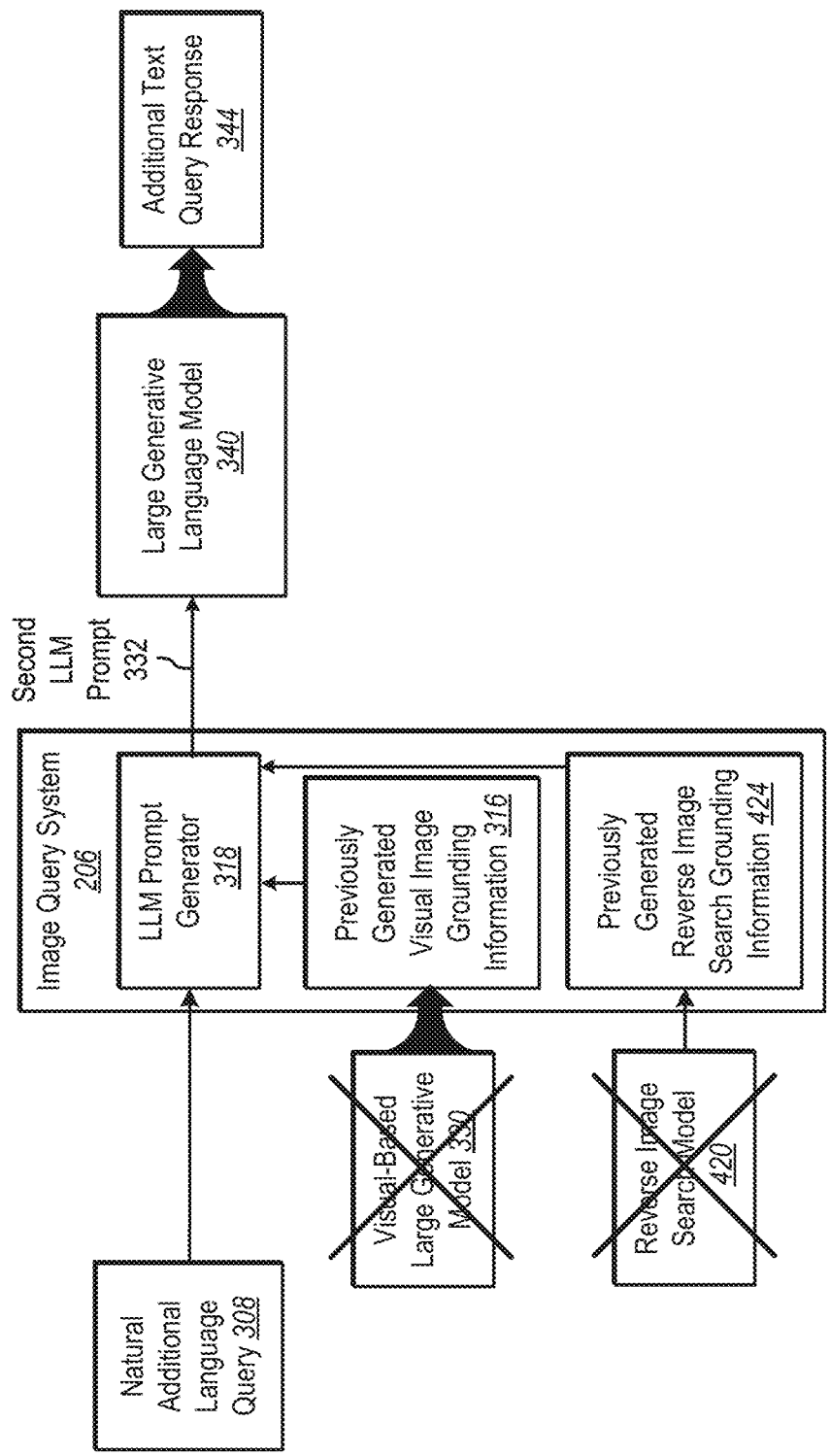
Figure 5A:
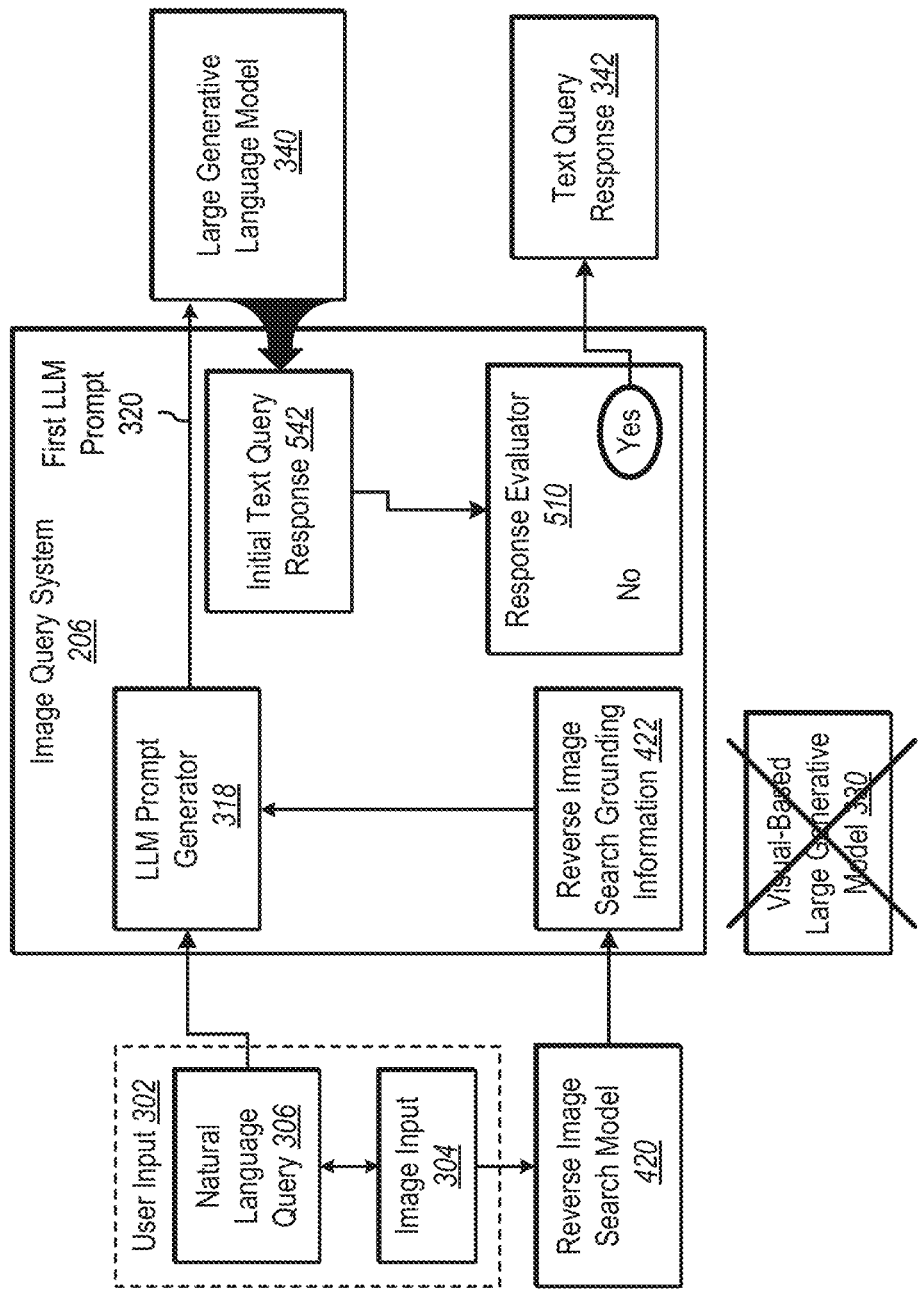
FIGS. 5A-5B illustrate example workflow diagrams for efficiently generating multiple text query responses using a large generative language model and reverse image search grounding information and selectively using the visual-based large generative model.
Figure 5B:
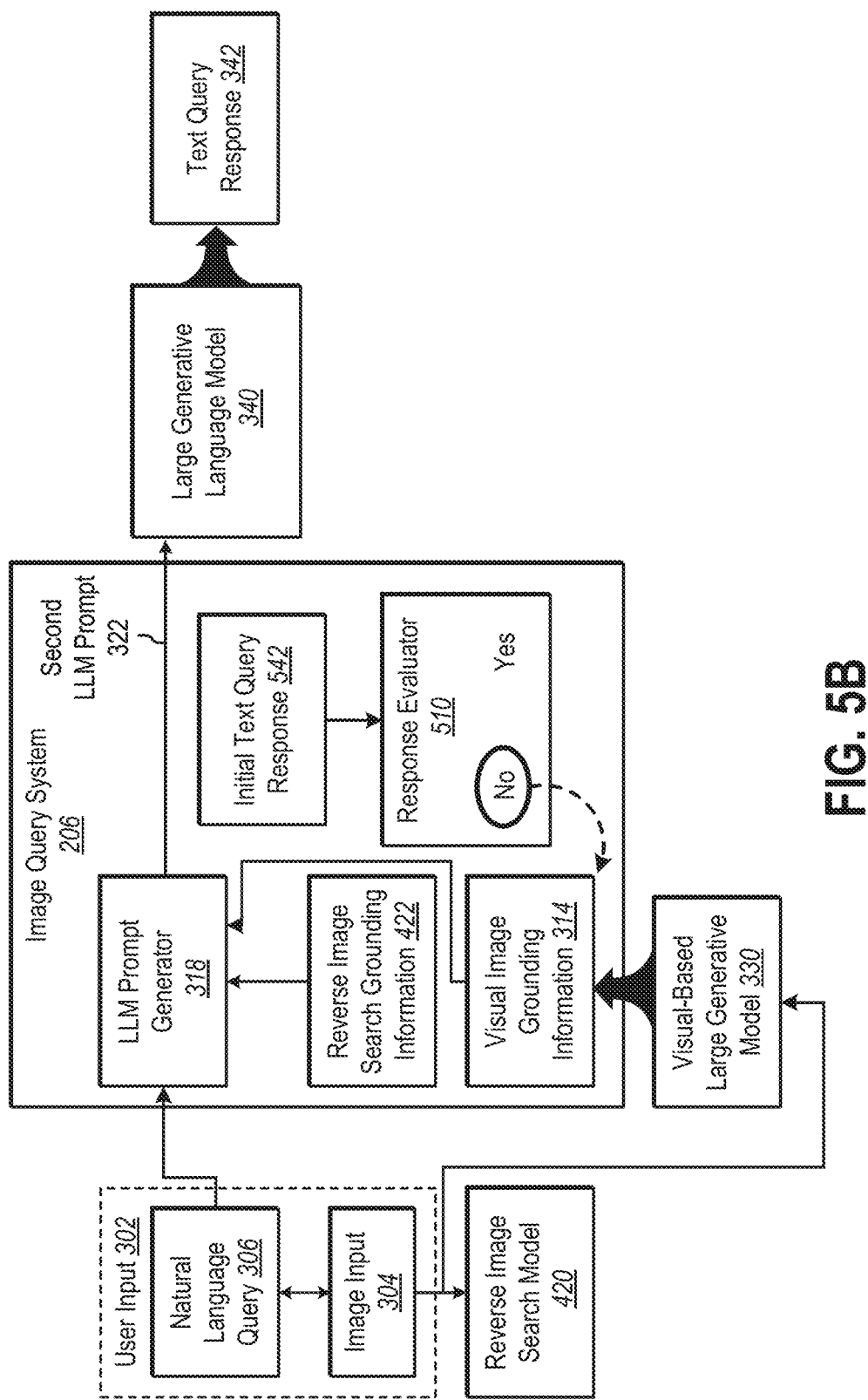

The next set of figures includes example workflows of the image query system efficiently generating accurate text query responses by providing dynamically obtained grounding information to a large generative model. For example, FIGS. 3A-3B illustrate generating text query responses based on visual image grounding information, FIG. 4A-4B illustrate generating text query responses based on image search grounding information and visual image grounding information; FIG. 5A-5B illustrate generating text query responses based on at least image search grounding information.

To elaborate, FIGS. 3A-3B illustrate example workflow diagrams of efficiently generating multiple text query responses using a large generative language model and a visual-based large generative model. In these figures, the image query system 206 generates text query responses based on visual image grounding information alone and not image search grounding information. In other words, in some implementations, the image query system 206 utilizes a visual-based large generative model but not a reverse image search model in generating text query responses.

As shown, FIG. 3A includes user input 302, a visual-based large generative model 330, the image query system 206, a large generative language model 340, and a text query response 342. The user input 302 includes an input image 304 and a natural language query 306. The image query system 206 includes an LLM prompt generator 318, a comprehensive image prompt 312, and visual image grounding information 314. Each of these components and elements is described below.

In many implementations, the image query system 206 receives user input 302 corresponding to a user search request or user chat query. More particularly, the image query system 206 receives an input image 304 and a natural language query 306, which corresponds to the input image 304. While FIG. 3A shows the image query system 206 receiving only the natural language query 306 from the user input 302, the image query system 206 receives both, but processes the pieces of information differently, as described next.

As mentioned above, FIG. 3A includes the visual-based large generative model 330. As shown, the visual-based large generative model 330 receives the input image 304 from the user input 302. While illustrated differently for clarity, in many implementations, the image query system 206 receives the input image 304 and then provides it to the visual-based large generative model 330 (along with the comprehensive image prompt 312) to generate the visual image grounding information 314.

In various implementations, the image query system 206 provides the comprehensive image prompt 312 to the visual-based large generative model 330, which includes or references the input image 304. For example, the comprehensive image prompt 312 is a set of contexts, parameters, and examples for instructing the visual-based large generative model 330 on what to include when generating the visual image grounding information. In many instances, the comprehensive image prompt 312 is the same as or similar to the input image 304.

In addition, as shown, the comprehensive image prompt 312 is independent of the natural language query 306. As mentioned above, to determine the context of an input image, the comprehensive image prompt 312 includes queries of different scopes about the visual information included in an input image. For example, the comprehensive image prompt 312 includes questions about what the image is of, whether a theme is present, whether the image appears real or synthetic; whether people are included, information about identified people, what the people are doing; whether any text is included, what does the text say, what language the text is in; whether objects are present, object types, the size and position of each object, object properties, how the objects relate to each other).

The comprehensive image prompt 312 may also include prompts about the metadata of an image. For example, the comprehensive image prompt 312 includes questions about the origin of the image, such as how and where the image was captured or created, and location information associated with the image, including a geographic location as well as an online location (e.g., URL). The comprehensive image prompt 312 may also include metadata questions, such as those relating to the size and color palettes present in the image, pixel density, and hash keys. The comprehensive image prompt 312 may include additional metadata questions.

Furthermore, the comprehensive image prompt 312 may provide parameters, such as input and output parameters. For instance, the comprehensive image prompt 312 includes system-level and/or metadata-level context information directing the visual-based large generative model on the perspective to use when analyzing the input image, output styles (e.g., casual or formal, output formats (e.g., bullet point, paragraphs, XML, tabular), the target audience, and output size limits. Additionally, the comprehensive image prompt 312 may include responsible artificial intelligence (AI) requirements that the large generative language model must follow to prevent it from processing and providing malicious, inappropriate, and unauthorized content.

Regarding responsible AI, the image query system 206 may include various checkpoints to ensure non-malicious and appropriate content. For example, upon receiving the input image 304, the image query system 206 ensures that the image passes a content audit. If not, the image query system 206 provides an error message back to the user. In addition, the image query system 206 may verify that any text query response provided to the user also passes a responsible AI verification check before returning the text query response.

Additionally, the comprehensive image prompt 312 may include output templates and/or output examples. Indeed, the comprehensive image prompt 312 may cover all aspects of analyzing and extracting visual information from an input image and how to report back the information as grounding information to the image query system 206. The comprehensive image prompt 312 may also include directions for providing the visual image grounding information as a single output or as separate outputs (e.g., one output for the image as a whole and additional outputs for each detected person, object, and/or theme).

Notably, calling the visual-based large generative model 330 is computationally expensive in terms of memory and processing power. For instance, the visual-based large generative model 330 is roughly twice as expensive as the large generative language model 340. However, the processing costs for the visual-based large generative model 330 are similar for both simple calls and complex calls. For example, providing a simplified prompt corresponding to the natural language query 306 costs roughly the same as providing the comprehensive image prompt 312, which anticipates answering queries corresponding to hundreds or thousands of queries. Accordingly, sending a single complex, comprehensive image prompt is much more efficient than sending multiple simple image prompts.

As shown, the visual-based large generative model 330 generates the visual image grounding information 314 from the input image 304 and the comprehensive image prompt 312. In various implementations, the visual image grounding information 314 includes a bullet point list of grounding information corresponding to the input image 304. As noted, this grounding information is not restricted to the natural language query 306 but rather covers a wide array of visual information about the input image 304.

In various implementations, the image query system 206 generates the first LLM prompt 320 from the visual image grounding information 314 and the natural language query 306 using the LLM prompt generator 318. In particular, the image query system 206 provides the natural language query 306 to the LLM prompt generator 318 along with the visual image grounding information 314. The LLM prompt generator 318 generates an LLM prompt to provide to the large generative language model 340 that directs the model to answer the natural language query 306 given the grounding information from the visual image grounding information 314. For example, the first LLM prompt 320 includes the prompt "Please answer the natural language query of <<natural language query>> using the provided information."

As illustrated, the large generative language model 340 generates the text query response 342 in response to the first LLM prompt 320. Because the large generative language model 340 was trained on large amounts of data, it efficiently processes the visual image grounding information 314, even if it includes a large amount of visual information about the input image 304. Furthermore, by having large amounts of visual information as image grounding information, the large generative language model 340 generates a highly accurate text query response to the natural language query 306.

In addition to the improvements in efficiency and accuracy achieved using the comprehensive image prompt 312 to generate the text query response 342, the image query system 206 achieves significant additional efficiency improvements when generating additional text query responses. In particular, when providing text query responses for additional natural language queries corresponding to the input image 304, the image query system 206 does not need to call the visual-based large generative model 330, which is computationally expensive. This concept is further described next.

To illustrate, FIG. 3B shows a workflow diagram of efficiently generating multiple text query responses using a large generative language model, but not the visual-based large generative model according to some implementations. FIG. 3B includes many of the same components and elements as FIG. 3A. In addition, FIG. 3B includes an additional natural language query 308 in place of the input image 304 and the natural language query 306. Notably, FIG. 3B does not include the input image 304 and the comprehensive image prompt 312. Further, while the visual-based large generative model 330 is shown, it is crossed out to emphasize its non-use for answering additional natural language queries.

As shown, the image query system 206 receives the additional natural language query 308. To be clear, the additional natural language query 308 corresponds to the input image 304 previously provided to the image query system 206. For example, the additional natural language query 308 is a follow-up question received upon providing the text query response 342 to a user within a search or chat service interface.

Upon receiving the additional natural language query 308, the image query system 206 utilizes the LLM prompt generator 318 again to generate a second LLM prompt 322 based on the additional natural language query 308 and the previously visual image grounding information 316. Indeed, the image query system 206 reuses the same visual image grounding information previously generated by the visual-based large generative model 330, which includes comprehensive information about the input image 304. This way, the image query system 206 saves significant processing resources by not calling the visual-based large generative model 330 again.

In some implementations, the second LLM prompt 322 is different from the first LLM prompt 320. For example, the LLM prompt generator 318 generates the second LLM prompt 322 based on the additional natural language query 308 but with the same visual image grounding information (e.g., the previously visual image grounding information 316). In particular, the second LLM prompt 322 prompts the large generative language model 340 to generate a text query response to answer the additional natural language query 308 given the visual image grounding information. For instance, the second LLM prompt 322 includes the prompt "Please answer the natural language query of additional natural language query using the provided grounding information."

Upon receiving the additional text query response 344 from the large generative language model 340, the image query system 206 provides it to the user. The image query system 206 may continue to receive natural language queries regarding the input image 304 and repeat the workflow shown in FIG. 3B to quickly and efficiently provide text query responses using the previously visual image grounding information 316 and without sending additional calls to the visual-based large generative model 330.

Turning to the next set of figures, FIGS. 4A-4B expand on the concepts described in FIGS. 3A-3B by introducing the use of reverse image search grounding information. In particular, FIG. 4A-4B illustrate example workflow diagrams that show how to efficiently generate multiple text query responses using a large generative language model, a visual-based large generative model, and reverse image search grounding information according to some implementations.

As shown, FIG. 4A includes many of the components and elements introduced earlier in FIG. 3A. For instance, FIG. 4A includes the user input 302 having the input image 304 and the natural language query 306; the visual-based large generative model 330; the image query system 206 with the comprehensive image prompt 312, the visual image grounding information 314, and the LLM prompt generator 318; the large generative language model 340; and the text query response 342. In addition, FIG. 4A includes a reverse image search model 420 that provides reverse image search grounding information 422 to the image query system 206.

In one or more implementations, the image query system 206 uses the reverse image search model 420 to generate reverse image search grounding information 422 for the input image 304. The reverse image search model 420 may utilize a variety of approaches (e.g., matching, feature extraction, indexing, ranking) to identify the input image 304 at external locations across different websites and/or external sources. The reverse image search model 420 may identify locations that include copies of the input image 304 (e.g., identical images) and/or similar images as the input image 304. The reverse image search model 420 may weigh the influence of information obtained from sources based on how close the identified image is to the input image 304 as well as the credibility of the source.

In various implementations, once the location of a matching or similar image is identified, the reverse image search model 420 extracts content corresponding to the identified image. For example, the reverse image search model 420 extracts texts, metadata, captions, comments, other images, and/or videos from these locations to generate reverse image search grounding information. In some cases, the reverse image search model 420 scrapes a webpage or a website that includes an identified image. In some cases, the reverse image search model 420 extracts only a portion of the content from a corresponding location.

For instance, if the input image 304 is of a recent event, the image may be included in various news articles, blogs, and forums. However, the reverse image search model 420 identifies news articles that include the image and/or similar images and obtains valuable and relevant grounding information about the image. Furthermore, if the same information is found at multiple locations or sources, the reverse image search model 420 may more confidently provide this information as the reverse image search grounding information 422.

As mentioned above, the image query system 206 may use the reverse image search model 420 to improve the accuracy of the text query response 342. For example, in some implementations, the visual-based large generative model 330 uses the reverse image search grounding information 422 to generate an improved version of the visual image grounding information 314. This is particularly useful when the input image 304 is unique (e.g., not frequently found online) or has been recently posted online.

As shown, the image query system 206 provides the reverse image search grounding information 422 to the LLM prompt generator 318. As before, the LLM prompt generator 318 generates the first LLM prompt 320 based on the natural language query 306 and grounding information. In the illustrated example, the grounding information includes both the visual image grounding information 314 and the reverse image search grounding information 422.

By providing the first LLM prompt 320 to the large generative language model 340, the model generates the text query response 342 as described above. By using both versions of grounding information, the large generative language model 340 further improves the accuracy of the text query response 342.

In FIG. 3A, the reverse image search model 420 is shown to run in parallel with the visual-based large generative model 330, and the LLM prompt generator 318 uses both types of grounding information to generate the first LLM prompt 320. In some implementations, the reverse image search model 420 runs before the visual-based large generative model 330 and provides the reverse image search grounding information 422 to the visual-based large generative model 330, as explained above. In general, the reverse image search model 420 is a computationally inexpensive model that quickly generates the reverse image search grounding information 422.

As explained earlier, the image query system 206 further improves processing efficiency when providing additional text query responses. To illustrate, FIG. 4B shows a workflow diagram of efficiently generating multiple text query responses using a large generative language model without using the visual-based large generative model or the reverse image search model 420 according to some implementations.

FIG. 4B includes many of the same components and elements introduced above. For example, FIG. 4B includes the additional natural language query 308 in place of the input image 304 and the natural language query 306, as introduced in FIG. 3B. Further, while the visual-based large generative model 330 and the reverse image search model 420 are shown, they are crossed out to emphasize their non-use for answering the additional natural language queries.

As shown, the image query system 206 receives the additional natural language query 308, which corresponds to the input image 304 provided to the image query system 206 with the previous natural language query. In many instances, the additional natural language query 308 is a follow-up question received upon providing the text query response 342 to a user within a search or chat service interface.

Upon receiving the additional natural language query 308, the image query system 206 utilizes the LLM prompt generator 318 again to generate a second LLM prompt 322 based on the additional natural language query 308, the previously visual image grounding information 316, and the previously generated versions of the reverse image search grounding information 424. The image query system 206 reuses the same visual image grounding information and reverse image search grounding information previously generated by the visual-based large generative model 330 and the reverse image search model 420. As shown, the large generative language model 340 generates an additional text query response 344 based on the second LLM prompt 322. Again, the image query system 206 saves significant processing resources by not calling the visual-based large generative model 330 or the reverse image search model 420 again.

As described above, the image query system 206 may continue to receive natural language queries regarding the input image 304 and repeat the workflow shown in FIG. 4B to quickly, efficiently, and accurately provide text query responses using the previously visual image grounding information 316 and the reverse image search grounding information 424 without sending additional calls to the visual-based large generative model 330 or the reverse image search model 420.

Turning to the next set of figures, FIGS. 5A-5B provide an alternative approach for using the visual-based large generative model 330, the reverse image search model 420, and the large generative language model 340 to generate a text query response 342. In particular, FIGS. 5A-5B illustrate example workflow diagrams for efficiently generating multiple text query responses using a large generative language model and reverse image search grounding information, and selectively using the visual-based large generative model, according to some implementations.

While FIGS. 5A-5B include many of the components and elements introduced above, the workflow performed by the image query system 206 differs from the workflows previously discussed. In particular, the workflow in FIGS. 5A-5B correspond to determining when to selectively use the visual-based large generative model 330. As described next, in FIG. 5A, the image query system 206 determines not to call the visual-based large generative model 330, thus saving a significant amount of bandwidth without sacrificing accuracy. In FIG. 5B, the image query system 206 determines to call the visual-based large generative model 330 to ensure accurate results, as described further below.

In FIG. 5A, upon receiving the user input 302, the image query system 206 provides the input image 304 to the reverse image search model 420 to generate the reverse image search grounding information 422 as previously described in connection with FIG. 4A. In addition, the image query system 206 utilizes the LLM prompt generator 318 to generate the first LLM prompt 320 using the natural language query 306 and the reverse image search grounding information 422. Unlike other workflows previously described, the LLM prompt generator 318 initially uses the grounding information from the reverse image search without using any visual image grounding information.

As shown, the image query system 206 provides the first LLM prompt 320 to the large generative language model 340, which generates an initial text query response 542. In these instances, the large generative language model 240 answers the natural language query 306 using only the reverse image search grounding information 422 and the other resources available to the large generative language model 340.

The image query system 206 uses a response evaluator 510 to determine whether the initial text query response 542 meets or satisfies a threshold confidence value. In various implementations, the threshold confidence value indicates whether a text query response is sufficiently accurate to provide to a user or whether the text query response is inadequate. In various implementations, the threshold confidence value is quantitative. In some implementations, the threshold confidence value is qualitative.

The response evaluator 510 may use various means to compare the initial text query response 542 to the threshold confidence value. For example, the large generative language model 340 may provide confidence values for each token (e.g., word) generated in the initial text query response 542. If the average token value is at or above the threshold confidence value of the response evaluator 510, the image query system 206 determines to provide the initial text query response 542 to the user as the text query response 342. Otherwise, the image query system 206 determines not to provide the initial text query response 542 to the user in response to the natural language query 306.

As another example, the response evaluator 510 uses a large generative model to determine whether the initial text query response 542 meets the threshold confidence value. For example, the response evaluator 510 generates a prompt that includes the natural language query 306 and the initial text query response 542 along with a query about how related or correlated the two inputs are. The large generative model then indicates whether the initial text query response 542 meets the threshold confidence value.

As shown in FIG. 5A, the image query system 206 determines that the initial text query response 542 meets the threshold confidence value, indicating that the initial text query response 542 is sufficiently accurate (e.g., the "yes" option is circled). Accordingly, the image query system 206 determines to provide the initial text query response 542 to the user as the text query response 342. In these implementations, the image query system 206 accurately answers the natural language query 306 without needing to call the visual-based large generative model 330, as indicated in FIG. 5A by this component being crossed out, which saves significant processing and memory resources.

In some implementations, the image query system 206 determines that the initial text query response 542 is inaccurate and does not meet the threshold confidence value. To illustrate, in FIG. 5B, the response evaluator 510 shows that the image query system 206 determined that the initial text query response 542 did not meet the threshold confidence value (e.g., the "no" option is circled). As a result, the image query system 206 may need to call the visual-based large generative model 330 to generate a more accurate text query response.

Based on the initial text query response 542 not meeting the threshold confidence value, the image query system 206 generates an updated text query response based on additional grounding information. In particular, the image query system 206 determines to obtain visual image grounding information to generate the updated text query response with improved accuracy.

To illustrate, as shown in FIG. 5B, the image query system 206 provides the input image 304 to the visual-based large generative model 330 to generate the visual image grounding information 314. The image query system 206 then provides the LLM prompt generator 318, the visual image grounding information 314, and the reverse image search grounding information 422 to the LLM prompt generator 318, which generates the second LLM prompt 322.

In addition, the image query system 206 provides the second LLM prompt 322, which references the visual image grounding information 314 and the reverse image search grounding information 422, to the large generative language model 340 to generate the text query response 342. Furthermore, the image query system 206 provides the text query response 342 to the user in response to the natural language query 306.

As shown in FIG. 5B, in various implementations, the image query system 206 selectively calls the visual-based large generative model 330 only after determining that generating a text query response without visual image grounding information is inadequate. Thus, when the visual image grounding information is not needed, the image query system 206 provides the text query response 342 with significantly fewer computing resources. However, when visual image grounding information is needed to provide a sufficiently accurate text query response, the image query system 206 may appropriately call on the visual-based large generative model 330 to generate the visual image grounding information, as described above.

In some implementations, the image query system 206 generates an LLM prompt that instructs the large generative language model 340 to determine a confidence score for a generated text query response. Additionally, the LLM prompt includes directions for the large generative language model 340 to obtain visual image grounding information from the visual-based large generative model 330 when the confidence score for the text query response is below the threshold confidence value. For example, the LLM prompt includes "Can you confidently answer the natural language query with all the provided information?" and "If not, call the visual-based large generative model for visual image grounding information to accurately answer the natural language query."

Figure 6:
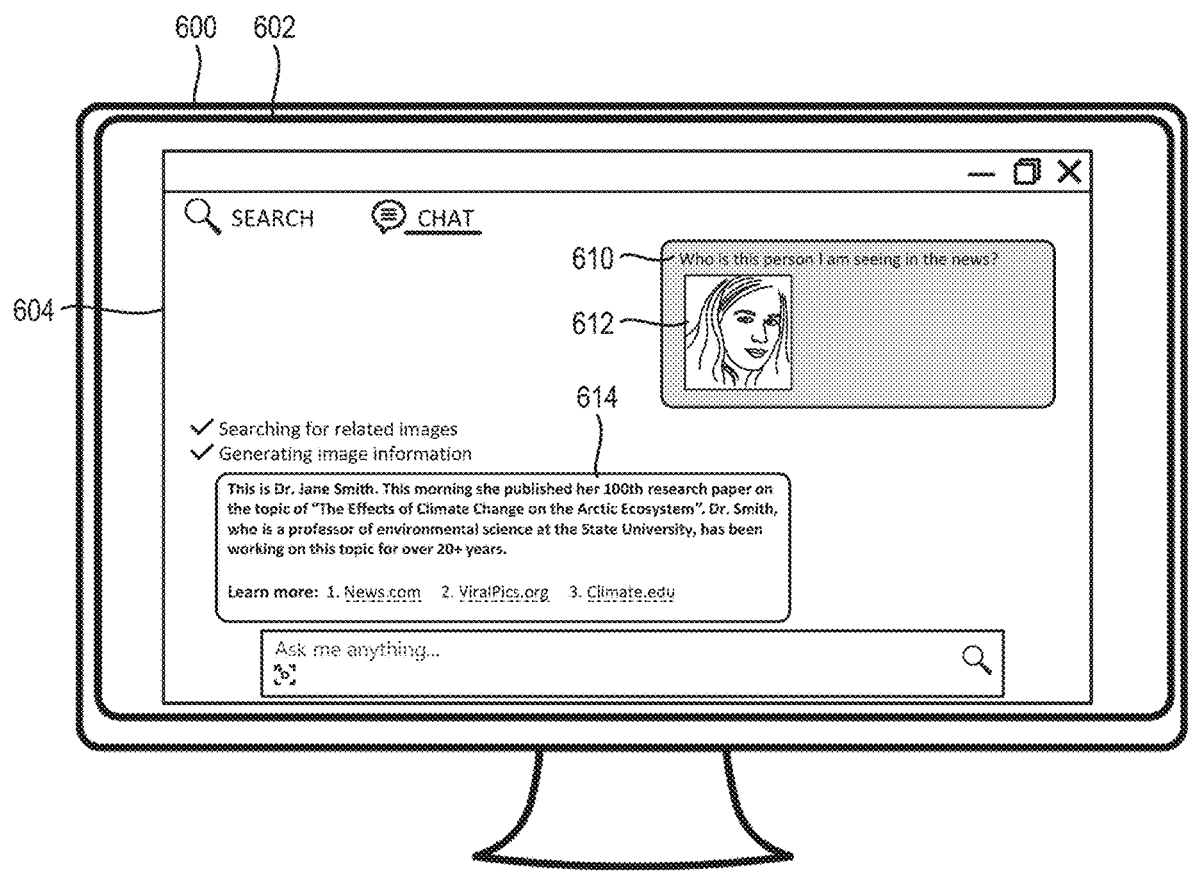
FIG. 6 illustrates an example graphical user interface for interacting with the image query system to generate text query responses to image-based queries for an input image.

FIG. 6 illustrates an example graphical user interface for interacting with the image query system to generate text query responses to image-based queries for an input image, according to some implementations. As illustrated, FIG. 6 includes a computing device 600 with a display showing a graphical user interface 602. For example, the graphical user interface 602 is displayed as part of a client application that allows access to functions of the image query system 206, such as via a content management system. Specifically, the graphical user interface 602 includes a client application 604 that enables an advanced chat service (e.g., a large generative model-based chat service) displayed on the computing device 600. In some implementations, the client application 604 is a web browser, dedicated mobile application, or another type of application.

The client application 604 shows the advanced chat service where a user can provide natural language queries and receive text responses. In addition, the user can provide an input image (or a link to an input image) and ask a question about the image. To illustrate, the client application 604 includes a user request with a natural language prompt 610 and an input image 612 corresponding to the prompt. In response, the image query system 206 provides a text query response 614 that accurately responds to the natural language prompt 610. The image query system 206 provides the text query response 614 using grounding information and a large generative language model as described above.

In addition, upon receiving the text query response 614, the user may provide additional natural language queries about the input image 612. In particular, without re-providing the input image 612, the user submits natural language queries about the image. As described above, the image query system 206 uses the previously generated grounding information (e.g., the reverse image search grounding information and/or the visual image grounding information) to generate text query responses without needing to again call the reverse image search model and/or visual-based large generative model, respectively.

Figure 7A:
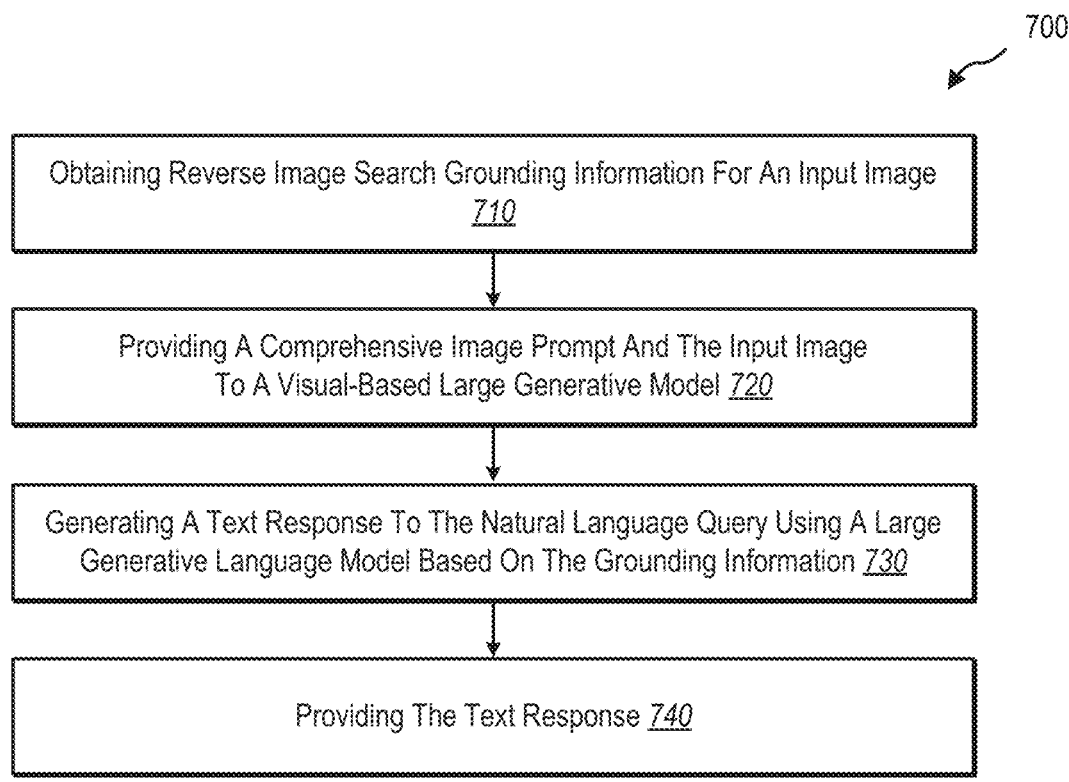
FIGS. 7A-7B illustrates an example series of acts in a computer-implemented method for providing text, audio, or other forms of user query responses to image-based queries.
Figure 7B:
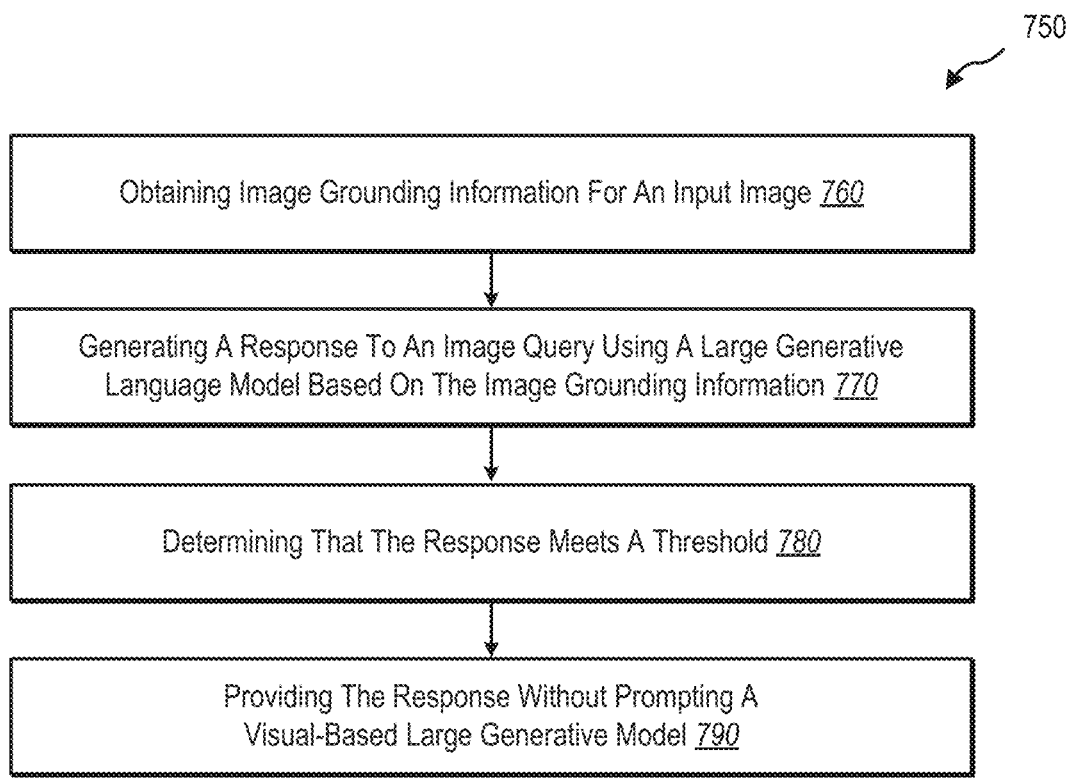

Turning now to FIGS. 7A-7B, these figures each illustrate an example flowchart that includes a series of acts for using the image query system. In particular, FIGS. 7A-7B each illustrates an example series of acts for providing text query responses to image-based queries according to some implementations.

While FIGS. 7A-7B each illustrates acts according to one or more implementations, alternative implementations may omit, add to, reorder, and/or modify any of the acts shown. Furthermore, the acts of FIGS. 7A-7B can each be performed as part of a method (e.g., a computer-implemented method). Alternatively, a computer-readable medium can include instructions that, when executed by a processing system having a processor, cause a computing device to perform each of the acts of FIGS. 7A-7B. In some implementations, a system (e.g., a processing system having a processor and a computer memory including instructions that, when executed by the processing system, cause the system to perform various actions or steps) can perform each of the acts of FIGS. 7A-7B.

As shown in FIG. 7A, the series of acts 700 includes act 710 of obtaining reverse image search grounding information for an input image. For instance, in example implementations, act 710 involves obtaining reverse image search grounding information for an input image based on receiving the input image and a natural language query corresponding to the input image.

In some implementations, act 710 includes obtaining the reverse image search grounding information for the input image by generating an initial text response to the natural language query using the large generative language model based on the reverse image search grounding information, determining that the initial text response does not meet a threshold confidence value, and providing the reverse image search grounding information and the comprehensive image prompt to the visual-based large generative model based on the initial text response not meeting the threshold confidence value (e.g., the initial text response did not meet the threshold confidence value).

In some implementations, act 710 includes obtaining the reverse image search grounding information for the input image by providing the input image to a reverse image search model and receiving the reverse image search grounding information from the reverse image search model. In some instances, the reverse image search model includes context information and metadata information for the input image. In some implementations, act 710 includes obtaining the reverse image search grounding information for the input image based on identifying the input image within an external online source, extracting text content from the external online source, and generating the reverse image search grounding information from the text content. In some implementations, act 710 includes obtaining the reverse image search grounding information for the input image based on identifying images similar to the input image within an external online source, extracting text content from the external online source, and generating the reverse image search grounding information from the text content.

As further shown in FIG. 7A, the series of acts 700 includes act 720 of providing a comprehensive image prompt and the input image to a visual-based large generative model. For instance, in some implementations, act 720 involves providing a comprehensive image prompt and the input image to a visual-based large generative model to generate visual image grounding information. In some implementations, act 720 includes obtaining reverse image search grounding information for the input image and providing the reverse image search grounding information to the visual-based large generative model along with the input image and the comprehensive image prompt.

In some instances, the large generative language model also uses the reverse image search grounding information to generate the text response to the natural language query. In some implementations, act 720 includes receiving the input image and the natural language query from a computing device. In some instances, the comprehensive image prompt is different from the natural language query, and/or the comprehensive image prompt does not include content from the natural language query. In some instances, the comprehensive image prompt provides instructions to the visual-based large generative model to identify context information for the input image, and/or the same version of the comprehensive image prompt is provided to the visual-based large generative model for different input images.

As further shown in FIG. 7A, the series of acts 700 includes act 730 of generating a response to the natural language query using a large generative language model based on the grounding information. For instance, in some implementations, act 730 involves generating a text response to the natural language query corresponding to the input image using a large generative language model based on the reverse image search grounding information and the visual image grounding information.

In some implementations, act 730 includes generating a prompt to provide to the large generative language model that includes the natural language query, the reverse image search grounding information, the visual image grounding information, and instructions to answer the natural language query based on the provided grounding information. In some implementations, act 730 includes receiving the visual image grounding information from the visual-based large generative model in response to providing the comprehensive image prompt and the input image to the visual-based large generative model. In some instances, the large generative language model is less computationally expensive to execute than the visual-based large generative model.

As further shown in FIG. 7A, the series of acts 700 includes act 740 of providing the response. For instance, in example implementations, act 740 involves providing the text response in response to the natural language query. In some implementations, act 740 includes receiving an additional natural language query corresponding to the input image and generating an additional text response using the large generative language model without sending additional prompts to the visual-based large generative model. In some implementations, the large generative language model generates the additional text response using the additional natural language query, the visual image grounding information previously generated by the visual-based large generative model, and the reverse image search grounding information previously obtained.

In some implementations, act 740 includes receiving an additional natural language query corresponding to the input image and generating an additional text response using the large generative language model without sending additional prompts to the visual-based large generative model. In some instances, the large generative language model generates the additional text response using the additional natural language query and the visual image grounding information previously generated by the visual-based large generative model. In some implementations, act 740 includes providing the text response to the computing device in response to the natural language query.

In various implementations, the series of acts 700 includes fewer acts. For example, the series of acts includes providing the input image and a comprehensive image prompt to a visual-based large generative model based on receiving an input image and a natural language query corresponding to the input image, generating a text response to the natural language query corresponding to the input image using a large generative language model based on visual image grounding information from the visual-based large generative model, and providing the text response in response to the natural language query. In these instances, reverse image search grounding information may not be used, only the visual image grounding information, to generate the text response.

As shown in FIG. 7B, the series of acts 750 includes act 760 of obtaining image grounding information for an input image. For instance, in some implementations, act 760 involves obtaining reverse image search grounding information for an input image based on receiving the input image and a natural language query corresponding to the input image.

As further shown in FIG. 7B, the series of acts 750 includes act 770 of generating a response to an image query using a large generative language model based on the image grounding information. For instance, in some implementations, act 770 involves generating a text response to the natural language query using a large generative language model based on the reverse image search grounding information.

As further shown in FIG. 7B, the series of acts 750 includes act 780 of determining that the response meets a threshold. For instance, in some implementations, act 780 involves determining that the text response meets a threshold confidence value.

As further shown in FIG. 7B, the series of acts 750 includes act 790 of providing the response without prompting a visual-based large generative model. For instance, in some implementations, act 790 involves providing the text response in response to the natural language query without prompting a visual-based large generative model, based on the text response meeting the threshold confidence value.

In some implementations, the series of acts 750 includes additional acts. For example, in one or more implementations, the series of acts 750 includes obtaining additional reverse image search grounding information for the additional input image based on receiving an additional input image and an additional natural language query corresponding to the additional input image, generating an additional text response to the additional natural language query using the large generative language model based on the additional reverse image search grounding information, determining that the additional text response does not meet the threshold confidence value, providing a comprehensive image prompt to the visual-based large generative model based on the text response not meeting the threshold confidence value, generating a new text response to the additional natural language query using the large generative language model based on the additional reverse image search grounding information and visual image grounding information received from the visual-based large generative model, and/or providing the new text response in response to the additional natural language query. In some implementations, the series of acts 750 includes providing the reverse image search grounding information and the comprehensive image prompt to the visual-based large generative model based on the text response not meeting the threshold confidence value.

Figure 8:
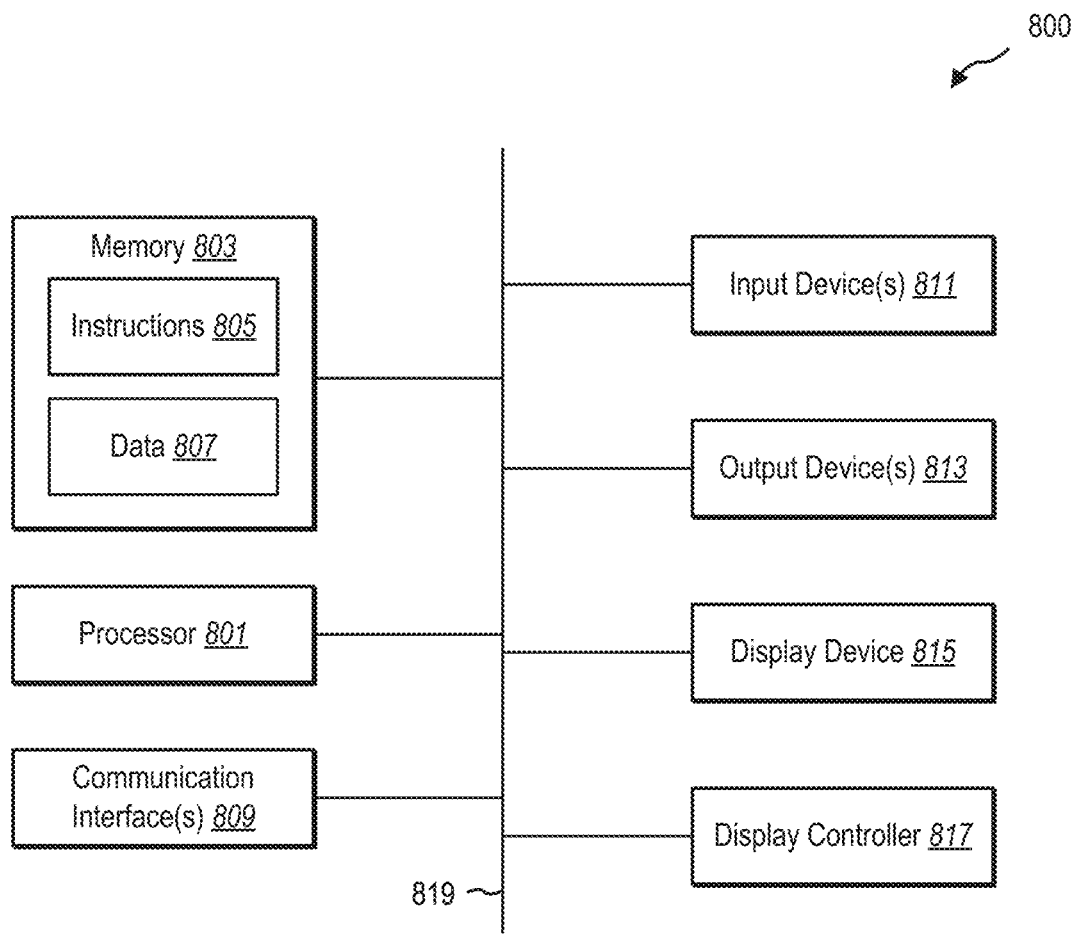
FIG. 8 illustrates example components included within a computer system.

FIG. 8 illustrates certain components that may be included within a computer system 800. The computer system 800 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 800 represents one or more of the client devices, server devices, or other computing devices described above. For example, the computer system 800 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processing system including a processor 801. The processor 801 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 801 may be referred to as a central processing unit (CPU) and may cause computer-implemented instructions to be performed. Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For clarity, the various buses are illustrated in FIG. 8 as a bus system 819.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for providing text responses to image-based queries:
   based on receiving an input image and a natural language query corresponding to the input image, obtaining reverse image search grounding information for the input image;
   providing a comprehensive image prompt and the input image to a visual-based large generative model to generate visual image grounding information;
   generating a text response to the natural language query corresponding to the input image using a large generative language model based at least in part on the reverse image search grounding information and the visual image grounding information; and
   providing the text response in response to the natural language query.

2. The computer-implemented method of claim 1, further comprising:
   receiving an additional natural language query corresponding to the input image; and
   generating an additional text response using the large generative language model without sending additional prompts to the visual-based large generative model.

3. The computer-implemented method of claim 2, wherein the large generative language model generates the additional text response using the additional natural language query, the visual image grounding information previously generated by the visual-based large generative model, and the reverse image search grounding information previously obtained.

4. The computer-implemented method of claim 1, wherein:
   the comprehensive image prompt is different from the natural language query; and
   the comprehensive image prompt does not include content from the natural language query.

5. The computer-implemented method of claim 1, wherein:
   the comprehensive image prompt provides instructions to the visual-based large generative model to identify context information for the input image; and
   a same version of the comprehensive image prompt is provided to the visual-based large generative model for different input images.

6. The computer-implemented method of claim 1, further comprising generating a prompt to provide to the large generative language model that includes the natural language query, the reverse image search grounding information, the visual image grounding information, and instructions to answer the natural language query based on provided grounding information.

7. The computer-implemented method of claim 1, further comprising obtaining the reverse image search grounding information for the input image by:
   generating an initial text response to the natural language query using the large generative language model based on the reverse image search grounding information;
   determining the initial text response does not meet a threshold confidence value; and
   based on the initial text response not meeting the threshold confidence value, providing the reverse image search grounding information and the comprehensive image prompt to the visual-based large generative model.

8. The computer-implemented method of claim 1, further comprising obtaining the reverse image search grounding information for the input image by:
   providing the input image to a reverse image search model; and
   receiving the reverse image search grounding information from the reverse image search model, wherein the reverse image search model includes context information and metadata information for the input image.

9. The computer-implemented method of claim 1, further comprising obtaining the reverse image search grounding information for the input image based on:
   identifying the input image within an external online source;
   extracting text content from the external online source; and
   generating the reverse image search grounding information from the text content.

10. The computer-implemented method of claim 1, further comprising obtaining the reverse image search grounding information for the input image based on:
    identifying images similar to the input image within an external online source;
    extracting text content from the external online source; and
    generating the reverse image search grounding information from the text content.

11. A system for providing text responses to image-based queries, the system comprising:
    a processing system; and
    a computer memory comprising instructions that, when executed by the processing system, cause the system to perform operations of:
      based on receiving an input image and a natural language query corresponding to the input image, providing the input image and a comprehensive image prompt to a visual-based large generative model;
      generating a text response to the natural language query corresponding to the input image using a large generative language model based on visual image grounding information from the visual-based large generative model; and
      providing the text response in response to the natural language query.

12. The system of claim 11, further comprising:
    receiving an additional natural language query corresponding to the input image; and
    generating an additional text response using the large generative language model without sending additional prompts to the visual-based large generative model.

13. The system of claim 12, wherein the large generative language model generates the additional text response using the additional natural language query and the visual image grounding information previously generated by the visual-based large generative model.

14. The system of claim 11, further comprising:
obtaining reverse image search grounding information for the input image; and
providing the reverse image search grounding information to the visual-based large generative model along with the input image and the comprehensive image prompt,
wherein the large generative language model also uses the reverse image search grounding information to generate the text response to the natural language query.

15. The system of claim 11, wherein:
the comprehensive image prompt providing instructions to the visual-based large generative model to identify context information for the input image; and
the comprehensive image prompt does not include content from the natural language query.

16. The system of claim 11, further comprising:
receiving the visual image grounding information from the visual-based large generative model in response to providing the comprehensive image prompt and the input image to the visual-based large generative model,
wherein the large generative language model is less computationally expensive to execute than the visual-based large generative model.

17. The system of claim 11, further comprising:
receiving the input image and the natural language query from a computing device; and
providing the text response to the computing device in response to the natural language query.

18. A computer-implemented method for providing text responses to image-based queries:
based on receiving an input image and a natural language query corresponding to the input image, obtaining reverse image search grounding information for the input image;
generating a text response to the natural language query using a large generative language model based on the reverse image search grounding information;
determining the text response meets a threshold confidence value; and
based on the text response meeting the threshold confidence value, providing the text response in response to the natural language query without prompting a visual-based large generative model.

19. The computer-implemented method of claim 18, further comprising:
based on receiving an additional input image and an additional natural language query corresponding to the additional input image, obtaining additional reverse image search grounding information for the additional input image;
generating an additional text response to the additional natural language query using the large generative language model based on the additional reverse image search grounding information;
determining the additional text response does not meet the threshold confidence value;
based on the text response not meeting the threshold confidence value, providing a comprehensive image prompt to the visual-based large generative model;
generating a new text response to the additional natural language query using the large generative language model based on the additional reverse image search grounding information and visual image grounding information received from the visual-based large generative model; and
providing the new text response in response to the additional natural language query.

20. The computer-implemented method of claim 19, further comprising providing the reverse image search grounding information and the comprehensive image prompt to the visual-based large generative model based on the text response not meeting the threshold confidence value.

* * * * *